United States Patent
Tran et al.

(10) Patent No.: US 12,226,933 B2
(45) Date of Patent: Feb. 18, 2025

(54) POLYETHYLENE BLEND

(71) Applicant: Borealis AG, Vienna (AT)

(72) Inventors: Tuan Anh Tran, Linz (AT); Susana Lopes Filipe, Evora (PT); Andreas Nagl, Linz (AT); Doris Machl, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 18/563,983

(22) PCT Filed: May 31, 2022

(86) PCT No.: PCT/EP2022/064702
§ 371 (c)(1),
(2) Date: Nov. 24, 2023

(87) PCT Pub. No.: WO2022/253804
PCT Pub. Date: Dec. 8, 2022

(65) Prior Publication Data
US 2024/0262012 A1 Aug. 8, 2024

(30) Foreign Application Priority Data
May 31, 2021 (EP) ..................... 21176834

(51) Int. Cl.
| | | |
|---|---|---|
| B29B 17/02 | (2006.01) | |
| B29B 9/12 | (2006.01) | |
| B29B 17/04 | (2006.01) | |
| B29K 23/00 | (2006.01) | |
| B29K 105/00 | (2006.01) | |
| B29K 105/06 | (2006.01) | |
| B29K 105/26 | (2006.01) | |

(52) U.S. Cl.
CPC .......... *B29B 17/02* (2013.01); *B29B 9/12* (2013.01); *B29B 17/0412* (2013.01); *B29B 2017/0203* (2013.01); *B29B 2017/0224* (2013.01); *B29K 2023/06* (2013.01); *B29K 2023/065* (2013.01); *B29K 2105/0085* (2013.01); *B29K 2105/0094* (2013.01); *B29K 2105/065* (2013.01); *B29K 2105/251* (2013.01); *B29K 2105/26* (2013.01); *B29K 2995/0018* (2013.01); *B29K 2995/0063* (2013.01); *B29K 2995/0077* (2013.01); *B29K 2995/0078* (2013.01)

(58) Field of Classification Search
CPC .......... C08L 2207/20; C08L 2205/025; C08L 23/0815; C08L 23/14; B29B 17/02; B29B 2017/0203; B29B 2017/0234; B29B 2017/0279; B29B 2017/0289; B29B 17/04; B29B 2017/0268; B29B 2017/0484; B29B 2017/0224; B29B 2017/0241; B29B 2017/0244; Y02W 30/62; C08F 210/16; C08F 4/65912; C08F 4/65916; C08F 2/001; C08F 210/08; C08F 210/14; C08F 2500/05; C08F 2500/08; C08F 2500/12; C08F 2500/26; C08F 4/65927
See application file for complete search history.

(56) References Cited

U.S. PATENT DOCUMENTS

| | | | |
|---|---|---|---|
| 5,767,230 A | 6/1998 | Scarola et al. | |
| 2018/0022905 A1 | 1/2018 | Buryak et al. | |
| 2018/0079898 A1 | 3/2018 | Wang | |
| 2019/0193303 A1 | 6/2019 | Heyde | |
| 2020/0207885 A1* | 7/2020 | Curren | C08L 23/0815 |
| 2020/0279671 A1 | 9/2020 | Doufas et al. | |

FOREIGN PATENT DOCUMENTS

| | | |
|---|---|---|
| CN | 112839990 A | 5/2021 |
| DE | 102016116742 A1 | 3/2018 |
| EP | 1141118 A1 | 10/2001 |
| EP | 1680451 A2 | 7/2006 |
| EP | 2697025 A1 | 2/2014 |
| EP | 3757152 A1 | 12/2020 |
| GB | 942369 A | 11/1963 |
| JP | 2019529649 A | 10/2019 |
| JP | 2020090656 A | 6/2020 |
| TW | 201244904 A | 11/2012 |
| WO | 2012139967 A1 | 10/2012 |
| WO | 2018046578 A1 | 3/2018 |
| WO | WO 2021/233820 | * 11/2021 |

OTHER PUBLICATIONS

K. Hyun et al. Progress in Polymer Science 36 (2011) (Year: 2011).*
Colors Distribution in Polymer Wastes and Color Prediction of Recycled Polymers (Year: 2019).*
Frank Welle: "Develop a food grade HDPE recycling process", The waste Resources Action Programme, Jun. 4, 2005, 138 pages.
International Search Report and Written Opinion for PCT/EP2022/064702 mailed Sep. 19, 2022, 11 pages.
European Search Report for European Patent Application No. 2117634.6, 8 pages.
Office Action for Taiwanese Patent Application No. 111120242 with English translation, dated Mar. 22, 2023, 17 pages.
S. Filipe, K. Klimke, A. T. Tran, J. Reussner, Proceedings of Novel Non-Linear Rheological Parameters for Molecular Structural Characterisation of Polyolefins, Novel Trends in Rheology IV, Zlin, Check Republik (2011).
Zhou, et al., "A new decoupling method for accurate quantification of polyethylene copolymer composition and triad sequence distribution with 13C NMR," Journal of Magnetic Resonance, vol. 187, 2007, pp. 225-233.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.

(Continued)

*Primary Examiner* — Yan Lan
(74) *Attorney, Agent, or Firm* — Lowenstein Sandler LLP

(57) ABSTRACT

Polyethylene blend with defined CIELAB color.

15 Claims, No Drawings

(56) References Cited

OTHER PUBLICATIONS

Singh, et al., "Triad Sequence Determination of Ethylene-Propylene Copolymers—Application of Quantitative 13C NMR," Polymer Testing, 2009, vol. 29, pp. 475-479.
Brandolini, et al, "NMR Spectra of Polymers and Polymer Additives", Mobil Chemical Company, Marcel Dekker Inc., 2000, 660 pages.
Ortin, A. et al., "Development of an Automated Cross-Fractionation Apparatus (TREF-GPC)for a Full Characterization of the Biuvariate Distribution of Polyolefins", Macromol. Symp. 2007, 257, pp. 13-28.
Heino et al., "Rheological Characterization of Polyethylene Fractions", Theoretical and Applied Rheology, Proc. XIth Int. Congr. on Rheology, Brussels, Belgium, Aug. 17-21, 1992, pp. 360-362.
Heino, et al., "The Influence of Molecular Structure on Some Rheological Properties of Polyethylene", Annual Transactions of the Nordic Rheology Society, 1995, pp. 71-73.
Definition of terms relating to the non-ultimate mechanical properties of polymers, Pure Appl. Chem., vol. 70, No. 3, pp. 701-754, 1998.
Dealy, et al. "Melt Rheology and Its Role in Plastics Processing: Theory and Applications", Van Nostrand Reinhold, New York, 1990, 6 pages.
S. Filipe, Non-Linear Rheology of Polymer Melts, AIP Conference Proceedings 1152, pp. 168-174 (2009).
Manfred Wilhelm, "Fourier-Tranform Rheology", Macromolecular Materials Engineering 2002, 287, pp. 83-105.
S. Filipe, K. Hofstadler, K. Klimke, A. T. Tran, Non-Linear Rheological Parameters for Characterisation of Molecular Structural Properties in Polyolefins, Proceedings of Annual European Rheology Conference, 135 (2010).
Demets, Ruben, et al. "Development and application of an analytical method to quantify odour removal in plastic waste recycling processes." Resources, Conservation and Recycling 161 (2020).
K. Klimke, S. Filipe, A. T. Tran, Non-linear rheological parameters for characterization of molecular structural properties in polyolefins, Proceedings of European Polymer Conference, Granada, Spain (2011).
Randall et al. "A Review of High Resolution Liquid 13Carbon Nuclear Magnetic Resonance Characterizations of Ethylene-Based Polymers", Journal of Macromolecular Science, 201-319, 1989.
Notification of Transmittal of the International Preliminary Reporting on Patentability for PCT/EP2022/064702 mailed Mar. 16, 2023 17 pages.
Chinese Office Action with English Translation for Chinese Patent Application No. 202280037672.2, dated Apr. 4, 2024 25 pages.
Office Action for Japanese Patent Application Serial No. 2023-572889, dated Jul. 9, 2024, in Japanese and English, 3 pages.

\* cited by examiner

POLYETHYLENE BLEND

CROSS-REFERENCE TO RELATED APPLICATION(S)

The present application is a national stage entry under 35 U.S.C. § 371 of International Application No. PCT/EP2022/064702, filed on May 31, 2022, which claims priority to European Patent application Ser. No. 21/176,834.6, filed on May 31, 2021. The contents of these applications are hereby incorporated by reference in their entirety.

FIELD OF THE INVENTION

The present invention relates to polyethylene blends as originating from recyclates.

BACKGROUND

Many attempts have been made for purifying recycling streams as originating from post-consumer trash. Among those measures washing, sieving, aeration, distillation and the like may be mentioned. For example, WO2018046578 discloses a process for the production of polyolefin recyclates from mixed color polyolefin waste including packaging waste comprising cold washing the waste with water followed by washing with an alkali medium at 60° C., followed by flake color sorting to receive color sorted (white, transparent, other colors) mono polyolefin rich fractions. Those fractions are then treated at 50-155° C. Welle, F. (2005). Develop, a food grade HDPE recycling process. *The waste & Resources Action Programme, Oxon* reports recycling of milk bottles with the aim of preparing a food grade HDPE. U.S. Pat. No. 5,767,230A describes a process comprising contacting PCR polyolefin chips containing volatile impurities with a heated gas at a superficial velocity sufficient to substantially reduce the volatile impurities such as odor active substances.

However, several problems remain: in a first aspect, benzene is frequently found in post-consumer recyclates, whereby the origin is still dubious but is a hurdle for end-uses in fields such as medical packaging, food packaging and the like.

Residual amounts, i.e. traces of benzene constitute a particularly problem as odor tests by sniffing experiments become impossible. Thus, end-uses having certain demands as to odor are blocked. In a second aspect, the mechanical properties of conventional post-consumer polyethylenes such as Charpy notched impact (at 23° C. and at −20° C.), ESCR, FNCT and drop test stability are pretty poor requiring expensive and per se undesirable upgrading components. In a third aspect, color is yet another remaining problem not completely addressed. Many re-use applications require material being close to what is usually denoted white color or alternatively what is usually denoted transparent. As yet a further problem known post consumer recyclates suffer from moderate homogeneity as reflected by too high OCS gel count levels.

Thus, the problem of providing a more valuable polyethylene blend remains.

SUMMARY OF THE INVENTION

The present invention provides a polyethylene blend having
(i) a melt flow rate (ISO1133, 5.0 kg; 190° C.) of 0.1 to 10 g/10 min, preferably 0.5 to 5.0 g/10 min, more preferably 0.7 to 4.0 g/10 min and most preferably 1.0 to 3.0 g/10 min; and
(ii) a density of 950 to 970 kg/m$^3$ (ISO1183); and
(iii) a C2 fraction in amount of above 95.0 wt.-%, preferably above 97.0 wt.-% as measured by NMR of the d2-tetrachloroethylene soluble fraction; and
(iv) a homopolymer fraction (HPF) content determined according to Chemical Composition Analysis by Cross Fractionation Chromatography (CFC) in the range from 80.0 to 91.0 wt.-%; and
(v) a copolymer fraction (CPF) content determined according to Chemical Composition Analysis Cross Fractionation Chromatography (CFC) in the range from 9.0 to 20.0 wt.-%; and
(vi) optionally a iso-PP fraction (IPPF) content determined according to Chemical Composition Analysis Cross Fractionation Chromatography (CFC) in the range from 0 to 2.0 wt.-%, preferably 0 to 0.5 wt.-%, whereby said iso-PP fraction (IPPF) is defined as the polymer fraction eluting at a temperature of 104° C. and above, whereby said homopolymer fraction (HPF), said copolymer fraction (CPF), and said iso-PP fraction (IPPF) add up to 100 wt.-%; and
(vii) inorganic residues (measured by TGA) of 0.01 to 2.00 wt.-% with respect to the total polyethylene blend; and
(viii) OCS gels of size 100 to 299 micrometer measured on 10 m$^2$ of film by an OCS count instrument within the range of 500 to 5000 counts per squaremeter; whereby
(ix) the polyethylene blend has a CIELAB color space (L*a*b*) measured according to DIN EN ISO 11664-4 of
L* from 75.0 to 86.0;
a* from −5.0 to 0.0;
b* from 5.0 to below 25.0 or
(x) the polyethylene blend has a CIELAB color space (L*a*b*) measured according to DIN EN ISO 11664-4 of
L* from above 86.0 to 97.0;
a* from −5.0 to 0.0;
b* from 0.0 to below 5.0.

The present invention is also concerned with the polyethylene blend in pellet form. The present invention further provides articles, particularly bottles made from the polyethylene blend and use of the polyethylene blend for packaging. In yet a further aspect, the present invention concerns blends of the polyethylene blend with at least one virgin polyolefins and/or recycled polyolefin.

The term "polyethylene blend" is defined as the presence of at least two different polyethylenes such as two high density polyethylenes differing as to their density. For example, a bimodal polyethylene as obtained from two reactors operated under different conditions constitutes a polyethylene blend, in this case an in-situ blend of two reactor products.

It is self explaining that polyethylene blends as obtained from consumer trash will include a broad variety of polyethylenes. In addition to that contamination by other plastics, mainly polypropylene, polystyrene, polyamide, polyesters, wood, paper, limonene, aldehydes, ketones, fatty acids, metals, and/or long term decomposition products of stabilizers can also be found. It goes without saying that such contaminants are not desirable.

It should be understood that the polyethylene blend of the present invention is not a cookie-cutter blend as some of the commercially available recyclates. The polyethylene blend according to the present invention should rather be compared with virgin blends.

The term "C2 fraction" denotes repetitive —[$C_2H_4$]— units derived from ethylene which are present in the linear chains backbone and the short chain branches as measured by quantitative $^{13}C\{^1H\}$ NMR spectroscopy, whereby repetitive means at least two units.

The C2 fraction can be calculated as $$wt_{C2fraction} = fC_{C2total} * 100/(fC_{C2total} + fC_{PP})$$

whereby $$fC_{C2total} = (Iddg - ItwoB4) + (IstarB1 * 6) + (IstarB2 * 7) + (ItwoB4 * 9) + (IthreeB5 * 10) + ((IstarB4plus - ItwoB4 - IthreeB5) * 7) + (I3s * 3)$$

and $$fC_{PP} = Isa\alpha * 3$$

Details are given in the experimental part.

As HDPE, LDPE or LLDPE, homo- and copolymer polyethylenes are present in recycling blends, analytical separation becomes a must for characterization. An adequate method is Chemical Composition Analysis by Cross fractionation Chromatography (CFC). This method has been described and successfully implemented by Polymer Char, Valencia Technology Par, Gustave Eiffel 8, Paterna E-46980 Valencia, Spain. Chemical Composition Analysis by Cross Fractionation Chromatography (CFC) allows fractionation into a homopolymer fraction (HPF) and a copolymer fraction (CPF) and a potentially present iso-PP fraction (IPPF). The homopolymer fraction (HPF) is a fraction including polyethylenes similar to homopolymer-HDPE. The copolymer fraction (CPF) is a fraction similar to polyethylene HDPE copolymer but can also include fractions of LDPE respectively LLDPE. The iso-PP fraction (IPPF) includes isotactic polypropylenes and is defined as the polymer fraction eluting at a temperature of 104° C. and above. The homopolymer fraction (HPF), the copolymer fraction (CPF) and the potentially present iso-PP fraction (IPPF) add up to 100 wt.-%. It is self-explaining the 100 wt.-% refer to the material being soluble within the Cross Fractionation Chromatography (CFC) experiment.

In addition to Chemical Composition Analysis by Cross Fractionation Chromatography (CFC), the polyethylene blend according to the present invention is also characterized by a C2 fraction in an amount of above 95.0 wt.-%, preferably above 97.0 wt.-% as measured by NMR of the d2-tetrachloroethylene soluble fraction. The percentage refer to the d2-tetrachloroethylene soluble part as used for the NMR experiment. The term "C2 fraction" equals the polymer fraction obtainable from ethylene monomer units, i.e. not from propylene monomer units.

The upper limit of the "C2 fraction" is 100 wt.-%.

The present invention is based on the surprising finding that the polyethylene blends as described herein allow a direct replacement of virgin polyethylene.

The polyethylene blend according to the present invention typically has a melt flow rate (ISO1133, 5.0 kg; 190° C.) of 0.1 to 10 g/10 min. The melt flow rate can be influenced by splitting post-consumer plastic waste streams, for example, but not limited to: originating from extended producer's responsibility schemes, like from the German DSD, or sorted out of municipal solid waste into a high number of pre-sorted fractions and recombine them in an adequate way. Usually MFR ranges from 0.5 to 5.0 g/10 min, preferably from 0.7 to 4.0 g/10 min, and most preferably from 1.0 to 3.0 g/10 min.

The polyethylene blend according to the present invention has a C2 fraction in amount of above 95.0 wt, preferably above 97.0 wt.-%, more preferably above 98.0 wt.-%, most preferably above 99.0 wt.-% as measured by NMR of the d2-tetrachloroethylene soluble fraction.

Usually the polyethylene blend according to the present invention is a recycled material.

Typically the recycling nature can be assessed by the presence of one or more of the following:
(1) inorganic residues content (measured by TGA) of above 0.01 wt.-%; and simultaneously
    OCS gels of size 100 to 299 micrometer measured on 10 m² of film by an OCS count instrument (preferably OCS-FSA 100, supplier OCS GmbH (Optical Control System)) within the range of 500 to 5000 counts per squaremeter;
alternatively or in combination
(2) limonene as determined by using solid phase microextraction (HS-SPME-GC-MS) in an amount of 0.5 ppm or higher;
alternatively or in combination
(3) fatty acids consisting of the group selected from acetic acid, butanoic acid, pentanoic acid and hexanoic acid as determined by using solid phase microextraction (HS-SPME-GC-MS) in a total amount of 10 ppm or higher.

It should be understood options (2) and (3) are preferred. "Fatty acids consisting of the group selected from acetic acid, butanoic acid, pentanoic acid and hexanoic acid" means that the individual amounts of acetic acid, butanoic acid, pentanoic acid and hexanoic acid (as determined by HS-SPME-GC-MS in ppm) are added together.

The detection limit for limonene in solid phase microextraction (HS-SPME-GC-MS) is below 0.1 ppm, i.e. traces of these substances easily allow figuring out recycling nature.

It goes without saying that the amounts of inorganic residues, gels, limonene, and fatty acids should be as low as possible.

It is particularly preferred that
limonene as determined by using solid phase microextraction (HS-SPME-GC-MS) is present in an amount of 0.1 to 25 ppm even more preferred 0.1 to 20 ppm; and/or total amount of fatty acids consisting of the group of acetic acid, butanoic acid, pentanoic acid and hexanoic acid as determined by using solid phase microextraction (HS-SPME-GC-MS) are present in a total amount of at least 10 to 500 ppm, more preferably 10 to 300 ppm, most preferably 10 to 180 ppm.

As far as color is concerned, two embodiments can be differentiated: an essentially colorless blend and an essentially white blend.

A first embodiment (the essentially colorless) polyethylene blend has a CIELAB color space (L*a*b*) measured according to DIN EN ISO 11664-4 of
L* from 75.0 to 86.0;
a* from −5.0 to 0.0;
b* from 5.0 to below 25.0

A second embodiment (the essentially white) polyethylene blend has a CIELAB color space (L*a*b*) measured according to DIN EN ISO 11664-4 of L* from above 86.0 to 97.0;
a* from −5.0 to 0.0;
b* from 0.0 to below 5.0.

The polyethylene blend according to the present invention is preferably characterized by an odor (VDA270-B3) of 2.5 or lower, preferably 2.0 or lower. It should be understood that many commercial recycling grades which do not report odor are in fact even inacceptable in this respect as sniffing tests as set forth by VDA270 are forbidden due to the presence of problematic or toxic substances.

The polyethylene blend according to the present invention has one or more of the following OCS gel count properties (measured on 10 m² of film)

a) size 300 to 599 micrometer: 100 to 2500 counts per squaremeter
b) size 600 to 1000 micrometer: 5 to 200 counts per squaremeter
c) size above 1000 micrometer: 1 to 40 counts per squaremeter The OCS gels are given as counts per squarementer calculated as the average of the 10 m² film measured.

In yet a further aspect, the polyethylene blend according to the present invention has a tensile modulus (ISO 527-2 at a cross head speed of 1 mm/min; 23° C.) using injection molded specimens as described in EN ISO 1873-2 (dog bone shape, 4 mm thickness) of at least 825 MPa, preferably at least 850 MPa, most preferably at least 910 MPa. Usually the tensile modulus will not be higher than 1100 MPa.

It is also preferred that the polyethylene blend does not have units originating from isotactic polypropylene when subjected to NMR analysis as described in the specification.

In yet a further preferred aspect, the polyethylene blend according to the present invention has a LAOS—NLF 1000% (190° C.) of 2.1 to 2.9, preferably 2.2 to 2.7 and most preferably 2.3 to 2.6. LAOS—NLF 1000% is a rheological measure of the long chain branching content defined as $$LAOS-NLF = \left|\frac{G'_1}{G'_3}\right|$$

whereby $G_1'$ is the first order Fourier Coefficient
$G_3'$ is the third order Fourier Coefficent The rather moderate or low value of LAOS—NLF 1000% indicates quite low, i.e. virtually negligible amounts of LDPE or LLDPE. The LAOS—NLF further indicates non-linear polymer structure. Apart from sorting out LDPE and LLDPE, it is possible to influence the LAOS—NLF by mixing several recycling streams (after determination of the value) from different sources for example from different states.

The polyethylene blend according to the present invention preferably has a shear thinning factor (STF)

$$STF = \frac{Eta^* \text{ for } (\omega = 0.05 \text{ rad/s})}{Eta^* \text{ for } (\omega = 300 \text{ rad/s})}$$

of above 46.0, more preferably from 48.0 to 60.0. The shear thinning factor (STF) indicates processability of a polyethylene. The shear thinning factor (STF) again can be influenced by mixing predetermined streams.

In a further aspect, the polyethylene blend according to the present invention preferably has a polydispersity index (PI)

$$PI = \frac{10^5}{Gc}$$

of above 2.0, more preferably from 2.1 to 2.7, where Gc is the cross over modulus, being the value of the shear storage modulus, G', when the shear storage modulus G' is equal to the shear loss modulus G". The polydispersity index (PI) is a rheological measurement of the broadness of the molecular weight distribution. Higher values such as above 2.0 or within the range of 2.1 to 2.7 are preferred from the perspective of processability, particularly moldability.

The polyethylene blend according to the present invention is preferably present in the form of pellets. Pelletization contributes to the low amounts of volatile substances and also to homogenisation.

Charpy notched impact strength of the polyethylene blend according to the present invention is preferably higher than 35.0 KJ/m² at 23° C., more preferably higher than 45 KJ/m² at 23° C. At −20° C. the Charpy notched impact strength of the polyethylene blend according to the present invention is preferably higher than 18.0 KJ/m² at 23° ° C., more preferably higher than 22 KJ/m². Tensile stress at yield is preferably higher than 25.0 MPa.

In a further aspect, the present invention concerns an article made from the polyethylene blend as described herein. It is preferred that the polyethylene blend according to the present invention amounts to at least 95 wt.-% of the reactants for making the article. The article is preferably a bottle. In a preferred aspect, the polyethylene blend according to the present invention amounts to a range from 95 wt.-% to 98 wt.-% of the reactants for making the article. Preferably the article is made from the polyethylene blend according to the present invention and additives only. In this embodiment, said additives are preferably selected from the group consisting of UV-stabilizers, antioxidants and/or acid scavengers.

In yet a further aspect, the present invention concerns blends containing the polyethylene blend as described herein and at least one virgin and/or recycled polyolefin. For example, virgin polyethylene homopolymer can be blended.

The present invention is also concerned with the polyethylene blend as described herein for packaging.

DETAILED DESCRIPTION

The process for providing the polyethylene blend according to the present invention is pretty demanding. The process comprises the following steps:

a) providing post-consumer plastic trash preferably from the separate waste collection or municipal solid waste containing polyethylene;
b) sorting out goods made from polystyrene, polyamide, polypropylene, metals, paper and wood thereby providing a post-consumer plastic material;
c) sorting out colored goods thereby providing a post-consumer plastic material containing mainly white bottles, white yoghurt cups, white cans, colorless panels, colorless component parts and the like whereas steps b) and c) can be combined or done separately;

d) optionally sorting out impurities by manual inspection
e) whereby receiving two streams of polyethylene material, a first stream being essentially transparent and a second stream being essentially of white color;
f) subjecting both streams separately to milling, washing in an aqueous solution with various detergents and subsequent drying, windsifting and screening yielding two pretreated streams;
g) subjecting the two pretreated streams (both; separately) to a further sorting for eliminating non-polyolefin and colored parts;
h) extruding into pellets;
i) optionally aeration which is preferably carried out at a temperature in a range of 100-130° ° C. by preheating the post-consumer plastic material to such temperature using an air stream having a temperature of at least 100° C. for at least 7 hours or preferably at least 20 hours.

Aeration is usually necessary but may be skipped under specific circumstances. Odor control and assessment is possible by a number of methods. An overview is provided inter alia by Demets, Ruben, et al. "Development and application of an analytical method to quantify odour removal in plastic waste recycling processes." *Resources, Conservation and Recycling* 161 (2020): 104907 being incorporated by reference herewith.

The present invention pertains to
A polyethylene blend as described herein, obtainable from the following steps
a) providing post-consumer plastic trash preferably from the separate waste collection or municipal solid waste containing polyethylene;
b) sorting out goods made from polystyrene, polyamide, polypropylene, metals, paper and wood thereby providing a post-consumer plastic material;
c) sorting out colored goods thereby providing a first intermediate stream of essentially colorless articles and a second intermediate stream of articles having essentially white color;
d) optionally sorting out impurities by manual inspection;
e) whereby receiving two streams of polyethylene material, a first stream being essentially transparent and a second stream being essentially of white color;
f) subjecting both streams separately to milling, washing in an aqueous solution with various detergents and subsequent drying, windsifting and screening yielding two pretreated streams;
g) subjecting the two pretreated streams separately to a further sorting for eliminating non-polyolefin and colored parts;
h) extruding into pellets;
i) optionally aeration at a temperature in a range of 100-130° C.

The inorganic residues may be lowered by solution techniques if necessary. The OCS gel count parameters can be controlled avoiding contaminants such as pigments from colored materials and the like. The manual sorting is preferably assisted by NIR spectroscopy being readily available also in the form of small portable devices. This allows to suppress the polypropylene content to a minimum. Density can be influenced by reducing the amount of relatively flexible polyethylene articles. The relative amounts of homopolymer fraction (HPF) and copolymer fraction (CPF) can be controlled by wind shifting (the machines are also called wind sifters): using an airflow, the materials are separated into various streams depending on the size, shape, and particularly weight of the particles. For example, polyethylene films (i.e. LLDPE/LDPE having relatively high copolymer fraction (CPF)) can be eliminated. CIELAB is controlled by the combination of color sorting and elimination of non-polyethylene polymeric impurities.

EXPERIMENTAL

The following Examples are included to demonstrate certain aspects and embodiments of the invention as described in the claims. It should be appreciated by those of skill in the art, however, that the following description is illustrative only and should not be taken in any way as a restriction of the invention.

Test Methods a) MFR

Melt flow rates were measured with a load of 5.00 kg (MFR5) at 190° C. The melt flow rate is that quantity of polymer in grams which the test apparatus standardized to ISO 1133 extrudes within 10 minutes at a temperature of 190° C. under a load of 5.00 kg.

b) Density

According to ISO 1183-1.

c) C2 Fraction by NMR Spectroscopy and General Microstructure Including "Continuous C3" as Well as Short Chain Branches Quantitative $^{13}C\{^1H\}$ NMR spectra were recorded in the solution-state using a Bruker AVNEO 400 MHz NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in approximately 3 m$^1$ of 1,2-tetrachloroethane-d2 (TCE-d2) along with approximately 3 mg BHT (2,6-di-tert-butyl-4-methylphenol CAS 128-37-0) and chromium-(III)-acetylacetonate (Cr(acac)$_3$) resulting in a 60 mM solution of relaxation agent in solvent {singh09}. To ensure a homogenous solution, after initial sample preparation in a heat block, the NMR tube was further heated in a rotatory oven for at least 1 hour. Upon insertion into the magnet the tube was spun at 10 Hz. Standard single-pulse excitation was employed without NOE, using an optimised tip angle, 1 s recycle delay and a bi-level WALTZ16 decoupling scheme {zhou07, busico07}. A total of 6144 (6 k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. Characteristic signals corresponding to polyethylene with different short chain branches (B1, B2, B4, B5, B6plus) and polypropylene were observed {randall89, brandolini00}.

Characteristic signals corresponding to the presence of polyethylene containing isolated B1 branches (starB1 33.3 ppm), isolated B2 branches (starB2 39.8 ppm), isolated B4 branches (twoB4 23.4 ppm), isolated B5 branches (threeB5 32.8 ppm), all branches longer than 4 carbons (starB4plus 38.3 ppm) and the third carbon from a saturated aliphatic chain end (3 s 32.2 ppm) were observed. If one or the other structural element is not observable it is excluded from the equations.

The intensity of the combined ethylene backbone methine carbons (ddg) containing the polyethylene backbone carbons (dd 30.0 ppm), γ-carbons (g 29.6 ppm) the 4 s and the threeB4 carbon (to be compensated for later on) is taken between 30.9 ppm and 29.3 ppm excluding the Tββ from polypropylene. The amount of C2 related carbons was quantified using all mentioned signals according to the following equation:

$$fC_{C2total} = (Iddg - ItwoB4) + (IstarB1*6) + (IstarB2*7) + (ItwoB4*9) +$$
$$(IthreeB5*10) + ((IstarB4plus - ItwoB4 - IthreeB5)*7) + (I3s*3)$$

When characteristic signals corresponding to the presence of polypropylene (PP, continuous C3) were observed at 46.7 ppm, 29.0 ppm and 22.0 ppm the amount of PP related carbons was quantified using the integral of Sαα at 46.6 ppm:

$$fC_{PP} = Is\alpha\alpha * 3$$

The weight percent of the C2 fraction and the polypropylene can be quantified according following equations:

$$wt_{C2fraction} = fC_{C2total} * 100/(fC_{C2total} + fC_{PP})$$
$$wt_{PP} = fC_{PP} * 100/(fC_{C2total} + fC_{PP})$$

Characteristic signals corresponding to various short chain branches were observed and their weight percentages quantified as the related branch would be an alpha-olefin, starting by quantifying the weight fraction of each:

$$fwtC2 =$$
$$fC_{C2total} - (IstarB1*3) - (IstarB2*4) - (ItwoB4*6) - (IthreeB5*7)$$
$$fwtC3(\text{isolated } C3) = IstarB1 * 3$$
$$fwtC4 = IstarB2 * 4$$
$$fwtC6 = ItwoB4 * 6$$
$$fwtC7 = IthreeB5 * 7$$

Normalisation of all weight fractions leads to the amount of weight percent for all related branches:

$$fsum_{wt\% total} = fwtC2 + fwtC3 + fwtC4 + fwtC6 + fwtC7 + fC_{PP}$$
$$wtC2total = fwtC2 * 100/fsum_{wt\% total}$$
$$wtC3total = fwtC3 * 100/fsum_{wt\% total}$$
$$wtC4total = fwtC4 * 100/fsum_{wt\% total}$$
$$wtC6total = fwtC6 * 100/fsum_{wt\% total}$$
$$wtC7total = fwtC7 * 100/fsum_{wt\% total}$$

zhou07
Zhou, Z., Kuemmerle, R., Qiu, X., Redwine, D., Cong, R., Taha, A., Baugh, D. Winniford, B., J. Mag. Reson. 187 (2007) 225
busico07
Busico, V., Carbonniere, P., Cipullo, R., Pellecchia, R., Severn, J., Talarico, G., Macromol. Rapid Commun. 2007, 28, 1128
singh09
Singh, G., Kothari, A., Gupta, V., Polymer Testing 28 5 (2009), 475
randall89
J. Randall, Macromol. Sci., Rev. Macromol. Chem. Phys. 1989, C29, 201.
brandolini00
A. J. Brandolini, D. D. Hills, NMR Spectra of Polymers and Polymer Additives, Marcel Dekker Inc., 2000 d) Polymer Composition Analysis by CFC—Determination of Homopolymer Fraction (HPF), Copolymer Fraction (CPF) and Iso-PP Fraction (IPPF)

The chemical composition distribution as well as the determination of the molecular weight distribution and the corresponded molecular weight averages (Mn, Mw and Mv) at a certain elution temperature (polymer crystallinity in solution) were determined by a full automated Cross Fractionation Chromatography (CFC) as described by Ortin A., Monrabal B., Sancho-Tello J., Macromol. Symp., 2007, 257, 13-28.

A CFC instrument (PolymerChar, Valencia, Spain) was used to perform the cross-fractionation chromatography (TREF×SEC). A four-band IR5 infrared detector (PolymerChar, Valencia, Spain) was used to monitor the concentration. The polymer was dissolved at 160° C. for 180 minutes at a concentration of around 0.4 mg/ml.

To avoid injecting possible gels and polymers, which do not dissolve in TCB at 160° C., like PET and PA, the weighed out sample was packed into stainless steel mesh MW 0.077/D 0.05 mmm.

Once the sample was completely dissolved an aliquot of 0.5 m$^1$ was loaded into the TREF column and stabilized for 60 minutes at 110° C. The polymer was crystallized and precipitated to a temperature of 60° C. by applying a constant cooling rate of 0.07° C./min. A discontinuous elution process is performed using the following temperature steps: (60, 65, 69, 73, 76, 79, 80, 82, 85, 87, 89, 90, 91, 92, 93, 94, 95, 95, 96, 97, 98, 99, 100, 102, 104, 107, 120, 130)

In the second dimension, the GPC analysis, 3 PL Olexis columns and 1× Olexis Guard columns from Agilent (Church Stretton, UK) were used as stationary phase. As eluent 1,2,4-trichlorobenzene (TCB, stabilized with 250 mg/L 2,6-Di tert butyl-4-methyl-phenol) at 150° C. and a constant flow rate of 1 mL/min were applied. The column set was calibrated using universal calibration (according to ISO 16014-2:2003) with at least 15 narrow MWD polystyrene (PS) standards in the range of 0.5 kg/mol to 11 500 kg/mol. Following Mark Houwink constants were used to convert PS molecular weights into the PE molecular weight equivalents.

$$K_{PS} = 19 \times 10^{-3} \text{mL/g}, \alpha_{PS} = 0.655$$
$$K_{PE} = 39 \times 10^{-3} \text{mL/g}, \alpha_{PP} = 0.725$$

A third order polynomial fit was used to fit the calibration data. Data processing was performed using the software provided from PolymerChar with the CFC instrument.

Calculation of the homopolymer fraction (HPF) and copolymer fraction (CPF) and iso-PP fraction (IPPF).

The homopolymer fraction (HPF), copolymer fraction (CPF) and iso-PP fraction (IPPF) are defined in the following way:

$$100\% = CPF + HPF + IPPF$$

whereby the IPPF fraction is defined as the polymer fraction eluting at a temperature of 104° C. and above.

Due to the slight dependence of the TREF profile on the low MW part, the molecular weight limit of the low MW limit is elution temperature ($T_{el}$) dependent. The low MW limit was determined using the following formula:

$$\text{Low } MW \text{ limit (for } HPF \text{ Fraction)} = 0.0125 * T_{el} + 2.875$$

Taking this into account the HPF fraction is calculated using the following approach.

$$HPF \text{ fraction in } wt.-\% = \frac{\sum_{i=60}^{94}\sum_{j}^{j=0.0125*i+2.875} H_{ij} + \sum_{i=95}^{140}\sum_{j=2}^{8} H_{ij}}{\sum_{i=60}^{140}\sum_{j=2}^{8} H_{ij}} - IPPF \quad (2)$$

where $H_{ij}$ is the 2D differential distribution at the corresponded elution temperature ($T_{el}$) i and the log M value j, obtained with the corresponded data processing software.

e) Inorganic Residues were determined by TGA according to DIN ISO 11358-1:2014 using a TGA Discovery TGA5500. Approximately 10-30 mg of material were placed in a platinum pan. The sample was heated under nitrogen at a heating rate of 20° C./min. The ash content was evaluated as the weight % at 850° C.

f) OCS Gels

A cast film sample of about 70 μm thickness, was extruded and examined with a CCD (Charged-Coupled Device) camera, image processor and evaluation software (Instrument: OCS-FSA100, supplier OCS GmbH (Optical Control System)). The film defects were measured and classified according to their circular diameter. 10 m² of film was analyzed and the value per squaremeter was calculated as the average.

Cast film preparation, extrusion parameters:
1. Output 25±4 g/min
2. Extruder temperature profile: 200-210-210-200 (Melt temperature 224° C.)
3. Film thickness about 70 μm
4. Chill Roll temperature 80° C.
5. Airknife 6400 NI/h (volume)

Technical data for the extruder:
1. Screw type: 3 Zone, nitrated
2. Screw diameter: 25 mm
3. Screw length: 25D
4. Feeding zone: 10D
5. Compression zone: 4D+output zone 11D
6. Die 150 mm The defects were classified according to the size (μm)/m²:
100-299 μm
300-599 μm
600-999 μm
1000 μm and higher g) CIELAB Color Space (L*a*b*)

In the CIE L*a*b* uniform color space, measured according to DIN EN ISO 11664-4, the color coordinates are:

L*—the lightness coordinate; a*—the red/green coordinate, with +a* indicating red, and −a* indicating green; and b*—the yellow/blue coordinate, with +b* indicating yellow, and −b* indicating blue. The L*, a*, and b*coordinate axis define the three dimensional CIE color space. Standard Konica/Minolta Colorimeter CM-3700A.

h) Evaluation of Recycled Nature ha) Limonene Content

Limonene quantification can be carried out using solid phase microextraction (HS-SPME-GC-MS) by standard addition.

50 mg ground samples are weighed into 20 mL headspace vials and after the addition of limonene in different concentrations and a glass-coated magnetic stir bar, the vial is closed with a magnetic cap lined with silicone/PTFE. Micro capillaries (10 pL) are used to add diluted limonene standards of known concentrations to the sample. Addition of 0, 2, 20 and 100 ng equals 0 mg/kg, 0.1 mg/kg, 1 mg/kg and 5 mg/kg limonene, in addition standard amounts of 6.6 mg/kg, 11 mg/kg and 16.5 mg/kg limonene is used in combination with some of the samples tested in this application. For quantification, ion-93 acquired in SIM mode is used. Enrichment of the volatile fraction is carried out by headspace solid phase microextraction with a 2 cm stable flex 50/30 pm DVB/Carboxen/PDMS fibre at 60° C. for 20 minutes. Desorption is carried out directly in the heated injection port of a GCMS system at 270° C.

GCMS Parameters:
Column: 30 m HP 5 MS 0.25*0.25
Injector: Splitless with 0.75 mm SPME Liner, 270° ° C.
Temperature program: −10° C. (1 min)
Carrier gas: Helium 5.0, 31 cm/s linear velocity, constant flow
MS: Single quadrupole, direct interface, 280° C. interface temperature
Acquisition: SIM scan mode
Scan parameter: 20-300 amu
SIM Parameter: m/Z 93, 100 ms dwell time hb) Fatty Acid Detection Fatty acid quantification is carried out using headspace solid phase micro-extraction (HS-SPME-GC-MS) by standard addition.

50 mg ground samples are weighed in 20 mL headspace vial and after the addition of limonene in different concentrations and a glass coated magnetic stir bar the vial is closed with a magnetic cap lined with silicone/PTFE. 10 μL Microcapillaries are used to add diluted free fatty acid mix (acetic acid, propionic acid, butyric acid, pentanoic acid, and hexanoic acid, optionally octanoic acid) standards of known concentrations to the sample at three different levels. Addition of 0, 50, 100 and 500 ng equals 0 mg/kg, 1 mg/kg, 2 mg/kg and 10 mg/kg of each individual acid. For quantification ion 60 acquired in SIM mode is used for all acids except propanoic acid, here ion 74 is used.

GCMS Parameter:
Column: 20 m ZB Wax plus 0.25*0.25
Injector: Split 5:1 with glass lined split liner, 250° C.
Temperature program: 40° ° C. (1 min) @6° C./min to 120° ° C., @15° C. to 245° C. (5 min)
Carrier: Helium 5.0, 40 cm/s linear velocity, constant flow
MS: Single quadrupole, direct interface, 220° C. inter face temperature Acquisition: SIM scan mode
Scan parameter: 46-250 amu 6.6 scans/s
SIM Parameter: m/z 60, 74, 6.6 scans/s.

hc) Metals determined by x ray fluorescence (XRF).

hd) Benzene Content by HS GC-MS 80° C./2 h, which is described as the following

Static Headspace Analysis

The parameters of the applied static headspace gas chromatography mass spectrometry (HS/GC/MS) method are described here.

4.000±0.100 g sample were weighed in a 20 ml HS vial and tightly sealed with a PTFE cap.

The mass spectrometer was operated in scan mode and a total ion chromatogram (TIC) was recorded for each analysis. More detailed information on applicable method parameters and data evaluation are given below:

HS parameter (Agilent G1888 Headspace Sampler)
Vial equilibration time: 120 min
Oven temperature: 80° C.
Loop temperature: 205° ° C.
Transfer line temperature: 210° C.
Low shaking
GC parameter (Agilent 7890A GC System)
Column: ZB-WAX 7HG-G007-22 (30 m×250 µm×1 µm)
Carrier gas: Helium 5.0
Flow: 2 m$^1$/min
Split: 5:1
GC oven program: 35° C. for 0.1 min
  10° C./min until 250° C.
  250° C. for 1 min
MS parameter (Agilent 5975C inert XL MSD)
Acquisition mode: Scan
Scan parameters:
Low mass: 20
  High mass: 200
  Threshold: 10
Software/Data evaluation
MSD ChemStation E.02.02.1431
MassHunter GC/MS Acquisition B.07.05.2479
AMDIS GC/MS Analysis Version 2.71
NIST Mass Spectral Library Version 2.0 g
AMDIS deconvolution parameters
Minimum match factor: 80
Threshold: Low
Scan direction: High to Low
Data file format: Agilent files
Instrument type: Quadrupole
Component width: 20
Adjacent peak subtraction: Two
Resolution: High
Sensitivity: Very high
Shape requirements: Medium
Solvent tailing: 44 m/z
Column bleed: 207 m/z
Min. model peaks: 2
Min. S/N: 10
Min. certain peaks: 0.5

Data Evaluation

The TIC data were further deconvoluted with the aid of AMDIS software (see parameters stated above) and compared to a custom target library which was based on the mass spectral library (NIST). In the custom target library, the respective mass spectra of selected substances (e.g. benzene) were included. Only when the recognised peak showed a minimum match factor of 80 and an experienced mass spectroscopist confirmed the match, a substance was accepted as "tentatively identified".

In this study, the statement "below the limit of detection (<LOD)" referred to a condition where either the match factor was below 80 (AMDIS) or the peak as such was not even recognised. The results refer solely to the measured samples, time of measurement and the applied parameters.

i) Odor VDA270-B3

VDA 270 is a determination of the odor characteristics of trim-materials in motor vehicles. The odor was determined following VDA 270 (2018) variant B3. The odor of the respective sample was evaluated by each assessor according to the VDA 270 scale after lifting the jar's lid as little as possible. The hexamerous scale consists of the following grades: Grade 1: not perceptible, Grade 2: perceptible, not disturbing, Grade 3: clearly perceptible, but not disturbing, Grade 4: disturbing, Grade 5: strongly disturbing, Grade 6: not acceptable. Assessors stay calm during the assessment and are not allowed to bias each other by discussing individual results during the test. They are not allowed to adjust their assessment after testing another sample, either. For statistical reasons (and as accepted by the VDA 270) assessors are forced to use whole steps in their evaluation. Consequently, the odor grade is based on the average mean of all individual assessments, and rounded to whole numbers.

j) Tensile Modulus and Tensile Strain at Break were measured according to ISO 527-2 (cross head speed=1 mm/min; test speed 50 mm/min at 23° C.) using injection molded specimens as described in EN ISO 17855-2 (dog bone shape, 4 mm thickness). The measurement was done after 96 h conditioning time of the specimens.

k) Impact Strength was determined as notched Charpy impact strength (1 eA) (non-instrumented)) according to ISO 179-1 eA at +23° C. and −20° C. on injection moulded specimens of 80×10×4 mm prepared according to EN ISO 1873-2.

l) Rheological Parameters

Dynamic Shear Measurements

The characterisation of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \tag{1}$$

If the applied strain is within the linear viscoelastic regime, the resulting sinusoidal stress response can be given by $$\sigma(t) = \sigma_0 \sin(\omega t + \delta) \tag{2}$$

where $\sigma_0$ and $\gamma_0$ are the stress and strain amplitudes, respectively ω frequency is the angular δ is the phase shift (loss angle between applied strain and stress response)

t is the time

Dynamic test results are typically expressed by means of several different rheological functions, namely the shear storage modulus G', the shear loss modulus, G", the complex shear modulus, G*, the complex shear viscosity, n*, the dynamic shear viscosity, n', the out-of-phase component of the complex shear viscosity n" and the loss tangent, tan δ which can be expressed as follows:

$$G' = \frac{\sigma_0}{\gamma_0}\cos\delta \text{ [Pa]} \quad (3)$$

$$G' = \frac{\sigma_0}{\gamma_0}\sin\delta \text{ [Pa]} \quad (4)$$

$$G^* = G' + iG'' \text{ [Pa]} \quad (5)$$

$$\eta^* = \eta' - i\eta'' \text{ [Pa.s]} \quad (6)$$

$$\eta' = \frac{G''}{\omega} \text{ [Pa.s]} \quad (7)$$

$$\eta'' = \frac{G'}{\omega} \text{ [Pa.s]} \quad (8)$$

ETA(x kPa) is determined according with equation 9.

$$ETA(x \text{ kPa}) = Eta^* \text{ for } (G^* = x \text{ kPa}) \text{ [Pa.s]} \quad (9)$$

For example, the ETA(2.7 kPa) is defined by the value of the complex viscosity, determined for a value of complex modulus equal to 2.7 kPa.

Eta (x rad/s) is determined according with equation 10.

$$ETA(x \text{ rad/s}) = Eta^* \text{ for } (\omega = x \text{ rad/s}) \text{ [Pa.s]} \quad (10)$$

For example, the ETA(300 rad/s) is defined by the value of the complex viscosity, determined at a frequency sweep of 300 rad/s.

Shear Thinning Factor (STF) and Polydispersity Index (PI)

Shear Thinning Factor (STF) is defined as $$STF = \frac{Eta^* \text{ for } (\omega = 0.05 \text{ rad/s})}{Eta^* \text{ for } (\omega = 300 \text{ rad/s})} [] \quad (11)$$

polydispersity index (PI) is defined as $$PI = \frac{10^5}{Gc}[]. \quad (12)$$

where Gc is the cross over modulus, that can be described as the value of the shear storage modulus, G', when the shear storage modulus G' is equal to the shear loss modulus G".

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "—Interpolate y-values to x-values from parameter" and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995).

[3] Definition of terms relating to the non-ultimate mechanical properties of polymers, Pure & Appl. Chem., Vol. 70, No. 3, pp. 701-754, 1998.

Large Amplitude Oscillatory Shear (LAOS)

The investigation of the non-linear viscoelastic behavior under shear flow was done resorting to Large Amplitude Oscillatory Shear. The method requires the application of a sinusoidal strain amplitude, $\gamma_0$, imposed at a given angular frequency, ω, for a given time, t. Provided that the applied sinusoidal strain is high enough, a non-linear response is generated. The stress, σ is in this case a function of the applied strain amplitude, time and the angular frequency. Under these conditions, the non-linear stress response is still a periodic function; however, it can no longer be expressed by a single harmonic sinusoid. The stress resulting from a non-linear viscoelastic response [0-0] can be expressed by a Fourier series, which includes the higher harmonics contributions:

$$\sigma(t, \omega, \gamma_0) = \gamma_0 \cdot \sum_n [G'_n(\omega, \gamma_0).\sin(n\omega t) + G''_n(\omega, \gamma_0).\cos(n\omega t)] \quad (1)$$

with, σ—stress response t—time

ω—frequency $\gamma_0$—strain amplitude n—harmonic number $G_n'$—n order elastic Fourier coefficient $G_n''$—n order viscous Fourier coefficient The non-linear viscoelastic response was analysed applying Large Amplitude Oscillatory Shear (LAOS). Time sweep measurements were undertaken on an RPA 2000 rheometer from Alpha Technologies coupled with a standard biconical die. During the course of the measurement the test chamber is sealed and a pressure of about 6 MPa is applied. The LAOS test is done applying a temperature of 190° C., an angular frequency of 0.628 rad/s and a strain of 1000%. In order to ensure that steady state conditions are reached, the non-linear response is only determined after at least 20 cycles per measurement are completed. The Large Amplitude Oscillatory Shear Non-Linear Factor (LAOS_NLF) is defined by:

$$LAOS_{NLF}(190° \text{ C.}, 1000\%) = \left|\frac{G'_1}{G'_3}\right| \quad (2)$$

where $G_1'$—first order Fourier Coefficient
$G_3'$—third order Fourier Coefficient
[1] J. M. Dealy, K. F. Wissbrun, *Melt Rheology and Its Role in Plastics Processing: Theory and Applications*; edited by Van Nostrand Reinhold, New York (1990)
[2] S. Filipe, Non-Linear Rheology of Polymer Melts, AIP Conference Proceedings 1152, pp. 168-174 (2009)
[3] M. Wilhelm, *Macromol. Mat. Eng.* 287, 83-105 (2002)
[4] S. Filipe, K. Hofstadler, K. Klimke, A. T. Tran, Non-Linear Rheological Parameters for Characterisation of Molecular Structural Properties in Polyolefins, Proceedings of Annual European Rheology Conference, 135 (2010)
[5] S. Filipe, K. Klimke, A. T. Tran, J. Reussner, Proceedings of Novel Non-Linear Rheological Parameters for Molecular Structural Characterisation of Polyolefins, Novel Trends in Rheology IV, Zlin, Check Republik (2011)
[6] K. Klimke, S. Filipe, A. T. Tran, Non-linear rheological parameters for characterization of molecular structural properties in polyolefins, Proceedings of European Polymer Conference, Granada, Spain (2011)

Production of the Bottles:

1 L bottles, having an outer diameter of 90 mm, a wall thickness of 0.6 mm, an overall-height of 204 mm and a height of the cylindrical mantle of 185 mm were produced by extrusion blow molding on a B&W machine with a single screw extruder using a melt temperature of 190° C. and a mold temperature of 15° C.

Drop Test on Bottles (Progressive):

During the progressive drop test each bottle as defined above is dropped several times in a row from increasing heights. The test is stopped for each bottle when fracture occurs.

The drop test is performed on the extrusion blow moulded 1 L bottles as decribed before. The bottles are filled up to their shoulder with water.

For each test series at least 12 bottles are required. 4 bottles are dropped simultaneously from a starting height which is chosen according to the following table, where the expected fracture drop height has been determined in pre-tests or has been chosen from experience:

| | Expected fracture drop height (m) | | |
|---|---|---|---|
| | 0.3-1-0 | 1.0-2.5 | 2.5-5.0 |
| Starting drop height (m) | 0.2 | 0.5 | 2.0 |

Those bottles that show fracture are discarded and the test is continued with the remaining bottles at increasing heights. The size of the steps by which the height is increased depends on the starting height. Below a starting height of 0.5 m, the step size is 0.1 m while equal to or above 0.5 m, the step size is 0.25 m. The fracture drop height is noted for each bottle and from the single values, the average fracture drop height is calculated according to the following formula:

$$h_p = \sum (h_i)/n_g$$

wherein $h_p$=average fracture drop height $h_i$=individual fracture drop height $n_g$=total number of dropped containers

EXAMPLES

Several post-consumer plastic trash HDPE streams from separate plastic waste collection (civic amenity sites offering specific HDPE collections) were coarsely sorted as to polymer nature and as to color. Impurities were further separated by manual inspection. The thus received two streams of colorless (→IE1) and white parts (→IE2) were subjected (separately) to milling, washing in an aqueous solution with various detergents and subsequent drying and screening yielding pretreated streams. The pretreated streams were further sorted thereby reducing colored parts and non-polyolefins. Upon extrusion into pellets the pellets were subjected to aeration at 120° ° C. air for 22 hours after pre-heating the substrate pellets to at least 100° C. Essentially colorless example IE1 and white colored example IE2 were obtained. For comparative purposes an ordinary recyclate CE1 (Purpolen) and a virgin bimodal polyethylene CE2 (in-situ mix of low molecular weight homopolymer and high molecular weight copolymer) were provided and tested. Results of the final materials are shown in Table 1. The virgin bimodal polyethylene CE2 made for comparative purposes (in-situ mix of low molecular weight homopolymer and high molecular weight copolymer) was made by polymerizing ethylene and an ultra low amount of 1-butene.

All examples were subjected to Polymer Composition Analysis by CFC.

TABLE 1

Characteristics of the inventive and comparative examples

| | IE1 | IE2 | CE1 | CE2 | claims |
|---|---|---|---|---|---|
| | "colorless" | "white" | ordinary recyclate | virgin bimodal HDPE with ultra low C4 content | |
| MFR(ISO1133; 190° C./5.0 kg), g/10 min | 2.2 | 1.4 | 2.3 | 1.3 | 0.1 to 10 |
| Density, kg/m³ ISO-1183 | 959 | 968 | 958 | 958 | 950 to 970 |
| C2 fraction (NMR) | >99.8 | >99.7 | 89.0 | 99.5 | >95.0 wt.-% |
| HPF (CFC) wt.-% | 87.5 | 83.7 | 73.9 | 96.3 | 80.0 to 91.0 |

TABLE 1-continued

Characteristics of the inventive and comparative examples

| | IE1 | IE2 | CE1 | CE2 | claims |
|---|---|---|---|---|---|
| CPF (CFC) wt.-% | 12.5 | 16.3 | 19.6 | 3.7 | 9.0 to 20.0 |
| IPPF (CFC)wt.-% | 0.0 | 0.0 | 6.5 | 0.0 | 0 to 2.0 |
| Inorganic residues (TGA), wt. % DIN ISO 1172 | 0.02 | 1.57 | 0.54 | <0.01 | 0.01 to 2.0 |
| OCS gel of size 100 to 299 micrometer (counts/m$^2$) measured on 10 m$^2$ film | 871 | 2960 | 10340 | 474 | 500 to 5000 |
| Limonene (HS-SPME-GC-MS) ppm | 18.9 | 18.6 | 19.0 | not detectable | 0.1 to 25 ppm |
| Fatty acids (acetic+, butanoic + pentanoic + hexanoic) (HS-SPME-GC-MS) ppm | 239 | 248 | 261 | not detectable | 10 to 500 ppm |
| Acetic acid | 105 | 110 | 119 | | |
| Butanoic acid | 26 | 29 | 33 | | |
| Pentanoic acid | 25 | 23 | 26 | | |
| Hexanoic acid HS-SPME-GC-MS) ppm | 83 | 86 | 83 | | |
| Color L* a* b* | 83.1 −3.6 15.2 | | 37 −2.0 0.8 | missing missing missing | "colorless" 75.0 to 86.0 −5.0 to 0.0 5.0 to 25.0 |
| Color L* a* b* | | 88.1 −0.97 1.2 | | | "white" >86.0 to 97.0 −5.0 to 0.0 0.0 to 5.0 |
| recycled? | yes | yes | yes | No, virgin | cl. 2 "recycled" |
| Limonene (HS-SPME-GC-MS) ppm | 18.9 | 18.6 | 19.0 | not detectable | cl. 3 0.1 to 20 ppm |
| Fatty acids (acetic+, butanoic + pentanoic + hexanoic) (HS-SPME-GC-MS) ppm | 239 | 248 | 261 | not detectable | cl. 3 10 to 300 ppm |
| Benzene presence (HS GC-MS 80° C./2 h) | <LOD (Limit of Detection) | <LOD (Limit of Detection) | <LOD (Limit of Detection) | <LOD (Limit of Detection) | prerequisite for VDA270-B3 test |
| Odor grade VDA270-B3 | 2.0 | 2.5 | 3.9 | 2 | cl. 4 ≤2.5 pref. ≤2.0 |
| OCS gel of size 300 to 599 micrometer (counts/m$^2$) measured on 10 m$^2$ film | 175 | 1917 | 4516 | 87 | cl. 5 100 to 2500 |
| OCS gel of size 600 to 1000 micrometer (counts/m$^2$) measured on 10 m$^2$ film | 21 | 117 | 2112 | 7 | cl. 5 10 to 200 |

TABLE 1-continued

Characteristics of the inventive and comparative examples

| | IE1 | IE2 | CE1 | CE2 | claims |
|---|---|---|---|---|---|
| OCS gel of size >1000 micrometer (counts/m$^2$) measured on 10 m$^2$ film | 5 | 27 | 996 | 0.4 (4 counts per 100 m$^2$) | cl. 5 1 to 40 |
| Tensile Modulus (ISO527-2), MPa | 980 | 926 | 901 | 1009 | cl. 6 ≥825, pref. ≥850, ≥m. pref. 910 MPa, |
| isotactic polypropylene detectable by NMR? | no | no | yes | no | cl. 7 |
| LAOS - NLF 1000% 190° C. | 2.58 | 2.48 | 3.01 | 2.0 | cl. 8 2.1 to 2.9 |
| shear thinning factor (STF) | 49.8 | 56.2 | 42.2 | 42.4 | cl. 9 >46.0, preferably from 48.0 to 60.0 |
| Polydispersity index (PI) | 2.4 | 2.2 | 1.6 | 2.0 | cl. 10 >2.1, preferably 2.1 to 2.7 |
| Pellets | yes | yes | yes | yes | cl. 11 |
| Charpy Notched Impact (NIS) +23° C., kJ/m$^2$ | 36.3 | 51.1 | 19.0 | 27.0 | |
| Charpy Notched Impact (NIS) −20° C., kJ/m$^2$ | 23.0 | 20.1 | 6.0 | 13 | |
| Tensile stress at yield/MPa | 26.3 | 25.6 | 23.1 | 26.8 | |
| Bottles made | yes | yes | yes | yes | cl. 11 |
| processability | ++ | ++ | +− | + | |
| melt stability | ++ | ++ | +− | ++ | |
| evenness of walls | ++ | ++ | −− | ++ | |
| welding lines quality | + | + | +− | + | |
| outer surface smoothness | ++ | ++ | +− | + | |
| 1 l drop test (0° C., av. drop height) m | 5.5 | 5.5 | 2.0 | 4.7 | |
| 1 l drop test (−20° C., av. drop height) m | 4.8 | 5.5 | 1.6 | n.d. | |

It can be seen that inventive examples IE1 and IE2 performed nearly as good as virgin material. Compared with a standard recyclate blend, the inventive blends had significantly lower OCS gel counts.

The Charpy notched impact properties turned out to be even better for inventive examples IE1 and IE2 when compared with the virgin in-situ bimodal blend CE2. Tensile stress at yield was on a similar level in IE1 and IE2 when compared with CE2. IE1 and IE2 had outstanding good LAOS—NLF, shear thinning factor and also polydispersity indicating excellent processability.

IE1 and IE2 could be made into bottles, whereby these bottles had excellent quality (evenness of walls, welding lines and outer surface smoothness). Processability of IE1 and IE2 even turned out to be the best of all evaluated materials. The bottles made from IE1 and IE2 performed even better than CE2 in drop tests.

In other words, a 1:1 replacement of virgin bimodal polyethylene becomes possible for numerous applications, whereby additional surprising advantages in terms of impact, processability and drop test stability of bottles are observed.

The invention claimed is:
1. A polyethylene blend having
   (i) a melt flow rate (ISO1133, 5.0 kg; 190° C.) of 0.1 to 10 g/10 min; and
   (ii) a density of 950 to 970 kg/m$^3$ (ISO1183); and
   (iii) a C2 fraction in an amount of above 95.0 wt.-% as measured by NMR of the d2-tetrachloroethylene soluble fraction; and
   (iv) a homopolymer fraction (HPF) content determined according to Chemical Composition Analysis by Cross Fractionation Chromatography (CFC) in the range from 80.0 to 91.0 wt.-%; and
   (v) a copolymer fraction (CPF) content determined according to Chemical Composition Analysis Cross Fractionation Chromatography (CFC) in the range from 9.0 to 20.0 wt.-%; and

(vi) optionally an iso-PP fraction (IPPF) content determined according to Chemical Composition Analysis Cross Fractionation Chromatography (CFC) in the range from 0 to 2.0 wt.-%, wherein the iso-PP fraction (IPPF) is defined as the polymer fraction eluting at a temperature of 104° C. and above, wherein the homopolymer fraction (HPF), said copolymer fraction (CPF), and said iso-PP fraction (IPPF) add up to 100 wt.-%; and (vii) inorganic residues (measured by TGA) of 0.01 to 2.00 wt.-% with respect to the total polyethylene blend; and (viii) OCS gels of size 100 to 299 micrometer measured on 10 m² of film by an OCS count instrument within the range of 500 to 5000 counts per squaremeter; and wherein (ix) the polyethylene blend has a CIELAB color space (L*a*b*) measured according to DIN EN ISO 11664-4 of L* from 75.0 to 86.0;
a* from −5.0 to 0.0;
b* from 5.0 to below 25.0
or (x) the polyethylene blend has a CIELAB color space (L*a*b*) measured according to DIN EN ISO 11664-4 of L* from above 86.0 to 97.0;
a* from −5.0 to 0.0;
b* from 0.0 to below 5.0;

wherein the polyethylene blend is a recycled material obtainable from the following steps a) providing post-consumer plastic trash;
b) sorting out goods made from polystyrene, polyamide, polypropylene, metals, paper and wood thereby providing a post-consumer plastic material;
c) sorting out colored goods thereby providing a first intermediate stream of essentially colorless articles and a second intermediate stream of articles having essentially white color;
d) optionally sorting out impurities by manual inspection;
e) wherein receiving two streams of polyethylene material, a first stream being essentially transparent and a second stream being essentially of white color;
f) subjecting both streams separately to milling, washing in an aqueous solution with various detergents and subsequent drying, windsifting and screening yielding two pretreated streams;
g) subjecting the two pretreated streams separately to a further sorting for eliminating non-polyolefin and colored parts;
h) extruding into pellets;
i) optionally aerating at a temperature in a range of 100-130° C.

2. The polyethylene blend according to claim 1 containing one or more of the following:

a) limonene as determined by using solid phase microextraction (HS-SPME-GC-MS) in an amount of 0.1 to 25 ppm; and
b) total amount of fatty acids consisting of the group of acetic acid, butanoic acid, pentanoic acid and hexanoic acid as determined by using solid phase microextraction (HS-SPME-GC-MS) of 10 to 500 ppm.

3. The polyethylene blend according to claim 1 having an odor (VDA270-B3) of 2.5 or lower.

4. The polyethylene blend according to claim 1 having one or more of the following OCS gel count properties (measured on 10 m² of film)

a) OCS gels of size 300 to 599 micrometer: 100 to 2500 counts per squaremeter;
b) OCS gels of size 600 to 1000 micrometer: 10 to 200 counts per squaremeter;
c) OCS gels of size above 1000 micrometer: 1 to 40 counts per squaremeter;

all measured on 10 m² of film by an OCS count instrument.

5. The polyethylene blend according to claim 1 having a tensile modulus (ISO 527-2 at a cross head speed of 1 mm/min; 23° C.) using injection molded specimens as described in EN ISO 1873-2 (dog bone shape, 4 mm thickness) of at least 825 MPa.

6. The polyethylene blend according to claim 1 not having units originating from isotactic polypropylene when subjected to NMR analysis.

7. The polyethylene blend according to claim 1, wherein the Large Amplitude Oscillatory Shear-Non-Linear Factor (LAOS—NLF) (190° C.; 1000%)

$$LAOS-NLF = \left|\frac{G'_1}{G'_3}\right|$$

whereby
$G_1'$ is the first order Fourier Coefficient
$G_3'$ is the third order Fourier Coefficient
is in the range of 2.1 to 2.9.

8. The polyethylene blend according to claim 1 wherein the shear thinning factor (STF)

$$STF = \frac{Eta^* \text{ for } (\omega = 0.05 \text{ rad/s})}{Eta^* \text{ for } (\omega = 300 \text{ rad/s})}$$

is above 46.0.

9. The polyethylene blend according to claim 1 wherein the polydispersity index (PI)

$$PI = \frac{10^5}{Gc}$$

is above 2.0,
where Gc is the cross over modulus, being the value of the shear storage modulus, G', when the shear storage modulus G' is equal to the shear loss modulus G".

10. The polyethylene blend according to claim 1, obtainable from the following steps a) providing post-consumer plastic trash from a separate waste collection or municipal solid waste collecting high purity polyethylene;
b) sorting out goods made from polystyrene, polyamide, polypropylene, metals, paper and wood thereby providing a post-consumer plastic material;
c) sorting out colored goods thereby providing a first intermediate stream of essentially colorless articles and a second intermediate stream of articles having essentially white color;
d) optionally sorting out impurities by manual inspection;
e) wherein receiving two streams of polyethylene material, a first stream being essentially transparent and a second stream being essentially of white color;
f) subjecting both streams separately to milling, washing in an aqueous solution with various detergents and subsequent drying, windsifting and screening yielding two pretreated streams;

g) subjecting the two pretreated streams separately to a further sorting for eliminating non-polyolefin and colored parts;

h) extruding into pellets;

i) aerating at a temperature in a range of 100-130° C.

11. The polyethylene blend according to claim 1 being in the form of pellets.

12. An article made from the polyethylene blend according to claim 1, wherein the polyethylene blend amounts to at least 95 wt.-% of the reactants for making the article.

13. The article according to claim 12 being a bottle.

14. A blend containing the polyethylene blend according to claim 1 and at least one virgin polyolefin and/or recycled polyolefin.

15. Use of the polyethylene blend according to claim 1 for packaging.

* * * * *